(12) United States Patent
Kwon et al.

(10) Patent No.: US 7,787,356 B2
(45) Date of Patent: Aug. 31, 2010

(54) METHOD AND APPARATUS FOR INDEXING PHYSICAL CHANNELS IN AN OFDMA SYSTEM

(75) Inventors: Hwan-Joon Kwon, Suwon-si (KR); Dong-Hee Kim, Yongin-si (KR); Jin-Kyu Han, Suwon-si (KR); Ju-Ho Lee, Suwon-si (KR); Joon-Young Cho, Suwon-si (KR); Yu-Chul Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1140 days.

(21) Appl. No.: 11/433,770

(22) Filed: May 15, 2006

(65) Prior Publication Data
US 2006/0256887 A1  Nov. 16, 2006

(30) Foreign Application Priority Data

May 13, 2005  (KR) .................. 10-2005-0040181
Jun. 16, 2005  (KR) .................. 10-2005-0051694

(51) Int. Cl.
*H04J 11/00* (2006.01)
(52) U.S. Cl. .................. 370/206; 370/344; 370/347; 370/442
(58) Field of Classification Search .......... 370/203, 370/329, 437
See application file for complete search history.

(56) References Cited

U.S. PATENT DOCUMENTS

| | | | |
|---|---|---|---|
| 5,867,478 A * | 2/1999 | Baum et al. | 370/203 |
| 6,538,985 B1 | 3/2003 | Petry et al. | |
| 6,545,997 B1 | 4/2003 | Bohnke et al. | |
| 7,123,596 B2 * | 10/2006 | Fukui | 370/329 |
| 2004/0095907 A1 | 5/2004 | Agee et al. | |
| 2005/0157803 A1 | 7/2005 | Kim et al. | |
| 2005/0195732 A1 | 9/2005 | Huh et al. | |

FOREIGN PATENT DOCUMENTS

| | | |
|---|---|---|
| KR | 2003/0054978 | 7/2003 |
| KR | 2004-0110870 | 12/2004 |
| KR | 2005-0000202 | 1/2005 |
| KR | 2005-0002225 | 1/2005 |
| TW | 393842 | 6/2000 |
| TW | 508967 | 11/2002 |
| TW | 535449 | 6/2003 |
| TW | I271048 | 1/2007 |

* cited by examiner

*Primary Examiner*—Seema S Rao
*Assistant Examiner*—Wanda Z Russell
(74) *Attorney, Agent, or Firm*—Roylance, Abrams, Berdo & Goodman, L.L.P.

(57) ABSTRACT

A method and system for indexing physical channels in an OFDMA system where one OFDM symbol includes a plurality of subcarriers and one TTI includes a plurality of OFDM symbols are provided. A total number of subcarriers per OFDM symbol are divided into N groups. A $k^{th}$ group is selected from the N groups in each OFDM symbol of a TTI, and a physical channel corresponding to a set of subcarriers indexed with predetermined values, included in the $k^{th}$ groups of the TTI is indexed with an ordered pair (N, k).

24 Claims, 13 Drawing Sheets

150 # METHOD AND APPARATUS FOR INDEXING PHYSICAL CHANNELS IN AN OFDMA SYSTEM

CROSS-REFERENCE TO RELATED APPLICATIONS

This application claims the benefit under 35 U.S.C. §119(a) of Korean Patent Application No. 2005-40181, filed May 13, 2005 in the Korean Intellectual Property Office, and Korean Patent Application No. 2005-51694, filed Jun. 16, 2005 in the Korean Intellectual Property Office, the entire disclosures of both of which are hereby incorporated by reference.

BACKGROUND OF THE INVENTION

1. Field of the Invention

The present invention relates generally to an Orthogonal Frequency Division Multiplexing (OFDM) wireless communication system. More particularly, the present invention relates to a method and apparatus for indexing physical channels in an OFDM wireless communication system.

2. Description of the Related Art

Active research is being conducted on the utilization of OFDM for a wireless communication system. OFDM is a special type of Multi-Carrier Modulation (MCM) in which an input serial symbol sequence is converted into parallel sequences and modulated to be mutually orthogonal multiple subcarriers, prior to transmission.

OFDM is more often used in digital transmission technologies. Examples of OFDM utilized in digital transmission technologies include Digital Audio Broadcasting (DAB), digital television, and Wireless Local Area Network (WLAN). Due to OFDM's robustness against multipath fading, OFDM provides an efficient platform for high-speed data transmission.

A major multiple access system based on OFDM is Orthogonal Frequency Division Multiple Access (OFDMA). In OFDMA, the frequency domain is divided into subchannels each having a plurality of subcarriers, the time domain is divided into a plurality of time slots, and the subchannels are allocated to different users. OFDMA, which allocates resources in the time-frequency domain, can accommodate numerous users while only using limited resources.

FIG. 1 illustrates an example of time-frequency resources in a conventional OFDM wireless communication system.

Referring to FIG. 1, the horizontal axis represents time and the vertical axis represents frequency. Since the OFDM system typically sends one modulation symbol (one Quadrature Phase Shift Keying (QPSK) or 16-ary Quadrature Amplitude Modulation (16 QAM) symbol) on one subcarrier 101, the subcarriers are basic resources. One rectangle representing one subcarrier in a specific OFDM symbol is time-frequency resources.

Generally, each OFDM symbol 102 includes a plurality of subcarriers. As shown in FIG. 1, all of the subcarriers are data subcarriers for delivering data, with there being no guard subcarriers. A basic packet transmission unit, called a Transmission Time Interval (TTI) 103, is formed with a set of OFDM symbols.

In FIG. 1, each small rectangle is called a time-frequency bin and a TTI 103 is comprised of a plurality of time-frequency bins. Physical channels are channels carrying different types of information like a paging channel, a Packet Data CHannel (PDCH), a Packet Data Control CHannel (PDCCH), and an uplink scheduling channel used in a typical mobile communication system.

Typically, one TTI 103 includes a plurality of physical channels. For instance, some time-frequency bins are used for the paging channel and others are used for a Common Control CHannel (CCCH) for providing system information during the TTI 103. Also, some time-frequency bins are allocated to the PDCH and others to the PDCCH for providing control information needed to demodulate the PDCH during the TTI 103. While not specified herein, other physical channels may be defined according to their purposes.

The physical channels require different time-frequency resources. Given 5,000 time-frequency bins for one TTI (i.e. 10 OFDM symbols for one TTI, each OFDM symbol including 500 data subcarriers), for example, resources can be allocated such that the paging channel has 100 subcarriers, the CCCH uses 500 subcarriers, 4000 subcarriers are used to deliver user data, and 400 subcarriers are used for sending PDCCHs.

In the above typical OFDM wireless communication system, resources are two-dimensionally configured in time and frequency and a plurality of physical channels require different amounts of resources. Therefore, the allocation of the time-frequency bins to the physical channels must be efficiently specified and also, the time-frequency bin allocations must be communicated between a transmitter and a receiver. If 5,000 subcarriers exist in one TTI, the transmitter must be able to notify the receiver that subcarriers #1 to #100 are for the paging channel and subcarriers #101 to #600 are allocated to a common channel. For this purpose, each physical channel can be identified using OFDM symbol indexes and subcarrier indexes. However, this method is inefficient because this method takes too much information to identify the subcarriers of each physical channel.

Specifically, when a plurality of PDCHs are multiplexed in a TTI, each PDCH is identified by a channel index. In correspondence with each channel index, OFDM symbols and subcarriers allocated to the channel of the channel index are preset between the transmitter and the receiver.

FIG. 2 illustrates an example of indexing a plurality of physical channels in the conventional OFDM wireless communication system.

Referring to FIG. 2, the horizontal axis represents time and the vertical axis represents frequency. Each OFDM symbol 202 includes a plurality of subcarriers and each TTI 203 is comprised of a plurality of physical channels. Each physical channel is equivalent to a Time-Frequency Diversity CHannel (TFDCH) 204, 205 or 206 in that one TFDCH is configured with a plurality of subcarriers scattered in time and frequency in a TTI 203. As illustrated in FIG. 2, subcarriers are allocated to each TFDCH for a specific TTI in a predetermined method and information about resources used for the TFDCH is defined by a corresponding channel index between the transmitter and the receiver.

The above conventional technology efficiently indicates subcarriers used for each physical channel in the case where all physical channels are of the same channel length (i.e. the same number of subcarriers are allocated to each physical channel during a TTI). However, when the physical channels have different channel lengths, it has limitations in indexing or indicating resources used for each physical channel.

Accordingly, there is a need for an improved method and apparatus for indexing physical channels in an OFDM wireless communication system for physical channels have different channel lengths.

SUMMARY OF THE INVENTION

Exemplary embodiments of the present invention address at least the above problems and/or disadvantages and provide at least the advantages described below. Accordingly, an aspect of the present invention is to provide a method and apparatus for effectively indicating time-frequency resources used for each physical channel, when physical channels having different channel lengths are multiplexed in an OFDM wireless communication system.

The exemplary embodiments of the present invention provide a method and apparatus for efficiently defining a resource allocation unit regarding two dimensional time-frequency resources in an OFDM wireless communication system.

The exemplary embodiments of the present invention provide a method and apparatus for efficiently allocating two dimensional time-frequency resources in an OFDM wireless communication system.

According to one aspect of an exemplary embodiment of the present invention, in a method of indexing physical channels in an OFDMA system where one OFDM symbol includes a plurality of subcarriers and one TTI includes a plurality of OFDM symbols, a total number of subcarriers per OFDM symbol are divided into N groups. A $k^{th}$ group is selected from the N groups in each OFDM symbol of a TTI, and a physical channel corresponding to a set of subcarriers indexed with predetermined values, included in the $k^{th}$ groups of the TTI is indexed with an ordered pair (N, k).

In a transmitter for indexing physical channels and transmitting the indexed physical channels in an OFDMA system where one OFDM symbol includes a plurality of subcarriers and one TTI includes a plurality of OFDM symbols, a transmission controller divides a total number of subcarriers per OFDM symbol into N groups, selects a $k^{th}$ group from the N groups in each OFDM symbol of the TTI, indexes a physical channel corresponding to a set of subcarriers indexed with predetermined values, included in the $k^{th}$ groups of the TTI with an ordered pair (N, k), and controls multiplexing of indexed physical channels. A physical channel indexer constructs index information of the physical channels under the control of the transmission controller, and an OFDM transmitter constructs a frame to be transmitted to a receiver by multiplexing the index information of the physical channels and a traffic channel, under the control of the transmission controller.

In a receiver for receiving indexed physical channels and information about the indexes of the physical channels in an OFDMA system where one OFDM symbol includes a plurality of subcarriers and one TTI includes a plurality of OFDM symbols, an OFDM receiver receives a frame from a transmitter and demultiplexes the received frame into the index information of physical channels and a traffic channel under the control of a reception controller. A physical channel index analyzer analyzes the index information of the received physical channels under the control of the reception controller. The reception controller controls the demultiplexing of the physical channels from a TTI. Each of the physical channels has been indexed by dividing a total number of subcarriers per OFDM symbol into N groups, selecting a $k^{th}$ group from the N groups in each OFDM symbol of the TTI, and indexing a physical channel corresponding to a set of subcarriers indexed with predetermined values, included in the $k^{th}$ groups with an ordered pair (N, k).

In a system for transmitting and receiving indexed physical channels in an OFDMA system where one OFDM symbol includes a plurality of subcarriers and one TTI includes a plurality of OFDM symbols, a base station includes a transmitter for dividing a total number of subcarriers per OFDM symbol into N groups, selecting a $k^{th}$ group from the N groups in each OFDM symbol of a TTI, indexing a physical channel corresponding to a set of subcarriers indexed with predetermined values, included in the $k^{th}$ groups that the TTI has with an ordered pair (N, k), and transmitting the indexed physical channel. A terminal includes a receiver for receiving the physical channel indexed with (N, k) from the transmitter of the base station.

According to another aspect of an exemplary embodiment of the present invention, in a method of indexing physical channels in an OFDMA system where one OFDM symbol includes a plurality of subcarriers and one TTI includes a plurality of OFDM symbols, a total number of subcarriers per OFDM symbol are divided into N groups. A $k^{th}$ group is selected from the N groups in each OFDM symbol of a TTI, and a physical channel corresponding to a set of subcarriers indexed with predetermined values, included in the $k^{th}$ groups that the TTI has is indexed with an ordered pair (N, k). The time-frequency resources corresponding to the ordered pair (N, k) are indicated by a base station-specific sequence S having L elements, wherein L is the number of OFDM symbols included in the TTI and S={S1, ..., SL}.

In a transmitter for indexing physical channels and transmitting the indexed physical channels in an OFDMA system where one OFDM symbol includes a plurality of subcarriers and one TTI includes a plurality of OFDM symbols, a transmission controller divides a total number of subcarriers per OFDM symbol into N groups. The transmitter controller then selects a $k^{th}$ group from the N groups in each OFDM symbol of the TTI, indexes a physical channel corresponding to a set of subcarriers indexed with predetermined values, included in the $k^{th}$ groups that the TTI has with an ordered pair (N, k), and controls multiplexing of indexed physical channels of the TTI. The time-frequency resources corresponding to the ordered pair (N, k) are indicated by a base station-specific sequence S having L elements, wherein L is the number of OFDM symbols included in the TTI and S={S1, ..., SL}. A physical channel indexer constructs information about the indexes of the physical channels under the control of the transmission controller and an OFDM transmitter constructs a frame to be transmitted to a receiver by multiplexing the index information of the physical channels and a traffic channel, under the control of the transmission controller.

In a receiver for receiving indexed physical channels and information about the indexes of the physical channels in an OFDMA system where one OFDM symbol includes a plurality of subcarriers and one TTI includes a plurality of OFDM symbols, an OFDM receiver receives a frame from a transmitter and demultiplexes the received frame into index information of physical channels and a traffic channel, under the control of a reception controller. A physical channel index analyzer analyzes the index information of the received physical channels, under the control of the reception controller. The reception controller controls the demultiplexing of the physical channels from a TTI. Each of the physical channels has been indexed by dividing a total number of subcarriers per OFDM symbol into N groups, selecting a $k^{th}$ group from the N groups in each OFDM symbol of the TTI, and indexing a physical channel corresponding to a set of subcarriers indexed with predetermined values, included in the $k^{th}$ groups with an ordered pair (N, k). Here, the time-frequency resources corresponding to the ordered pair (N, k) are indicated by a base station-specific sequence S having L elements, wherein L is the number of OFDM symbols included in the TTI and S={S1, . . . , SL}.

In a system for transmitting and receiving indexed physical channels in an OFDMA system where one OFDM symbol includes a plurality of subcarriers and one TTI includes a plurality of OFDM symbols, a base station includes a transmitter and a terminal includes a receiver. The transmitter divides a total number of subcarriers per OFDM symbol into N groups. The transmitter then selects a $k^{th}$ group from the N groups in each OFDM symbol of a TTI, indexes a physical channel corresponding to a set of subcarriers indexed with predetermined value, included in the $k^{th}$ groups that the TTI has with an ordered pair (N, k), and controls multiplexing of indexed physical channels of the TTI. Here, the time-frequency resources corresponding to the ordered pair (N, k) are indicated by a base station-specific sequence S having L elements, wherein L is the number of OFDM symbols included in the TTI and S={S1, . . . , SL}. The receiver receives the physical channel indexed with (N, k) from the transmitter of the base station.

According to a further aspect of exemplary embodiment of the present invention, in a method of indexing physical channels in an OFDMA system where one OFDM symbol includes a plurality of subcarriers and one TTI includes a plurality of OFDM symbols, time-frequency resources of a TTI are divided into N equidistant and localized groups and a physical channel corresponding to a $k^{th}$ group among the N groups is indexed with an ordered pair (N, k). The $k^{th}$ group is further divided in time into m equidistant groups and physical channels corresponding to the divided groups are indexed with ordered triples (N, k, m).

In a transmitter for indexing physical channels and transmitting the indexed physical channels in an OFDMA system where one OFDM symbol includes a plurality of subcarriers and one TTI includes a plurality of OFDM symbols, a transmission controller divides time-frequency resources of the TTI into N equidistant and localized groups, indexes a physical channel corresponding to a $k^{th}$ group among the N groups with an ordered pair (N, k), divides the $k^{th}$ group in time into m equidistant groups, indexing physical channels corresponding to the divided groups with ordered triples (N, k, m), and controls multiplexing of the indexed physical channels. A physical channel indexer constructs index information of the physical channels, under the control of the transmission controller. An OFDM transmitter constructs a frame to be transmitted to a receiver by multiplexing the index information of the physical channels and a traffic channel, under the control of the transmission controller.

In a receiver for receiving indexed physical channels and information about the indexes of the physical channels in an OFDMA system where one OFDM symbol includes a plurality of subcarriers and one TTI includes a plurality of OFDM symbols, an OFDM receiver receives a frame from a transmitter and demultiplexes the received frame into the index information of physical channels and a traffic channel, under the control of a reception controller. A physical channel index analyzer analyzes the index information of the received physical channels under the control of the reception controller. The reception controller controls the demultiplexing of the physical channels from a TTI. Each of the physical channels has been indexed by dividing time-frequency resources of the TTI into N equidistant and localized groups, indexing a physical channel corresponding to a $k^{th}$ group among the N groups with an ordered pair (N, k), dividing the $k^{th}$ group in time into m equidistant groups, and indexing physical channels corresponding to the divided groups with ordered triples (N, k, m).

In a system for transmitting and receiving indexed physical channels in an OFDMA system where one OFDM symbol includes a plurality of subcarriers and one TTI includes a plurality of OFDM symbols, a base station includes a transmitter and a terminal includes a receiver. The transmitter divides time-frequency resources in the TTI into N equidistant and localized groups, indexes a physical channel corresponding to a $k^{th}$ group among the N groups with an ordered pair (N, k), divides the $k^{th}$ group in time into m equidistant groups, indexing physical channels corresponding to the divided groups with ordered triples (N, k, m), and transmits the indexed physical channels. The receiver receives the physical channel indexed with (N, k) from the transmitter of the base station.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
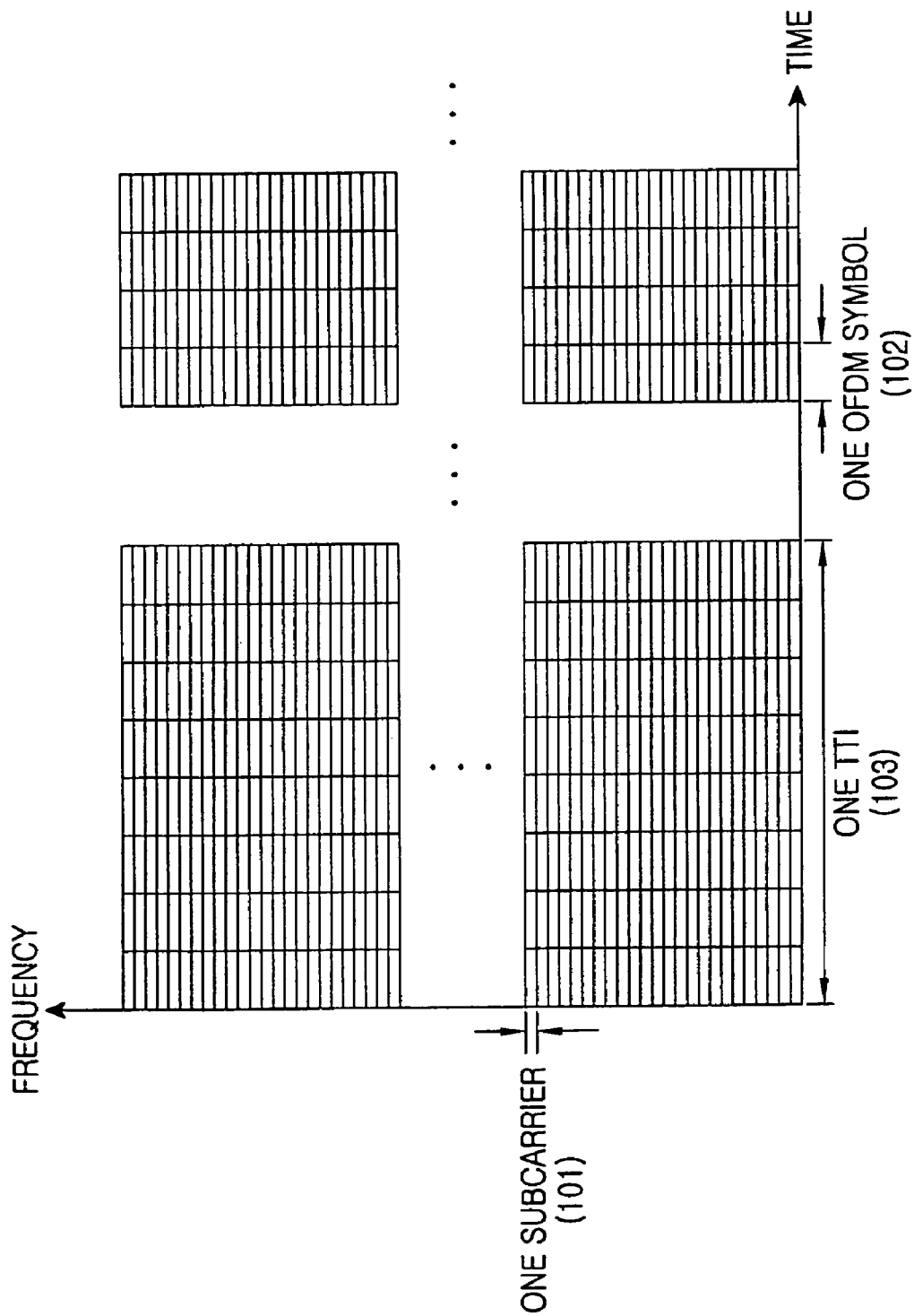
FIG. 1 illustrates an example of time-frequency resources in a conventional OFDM wireless communication system.
Figure 2:
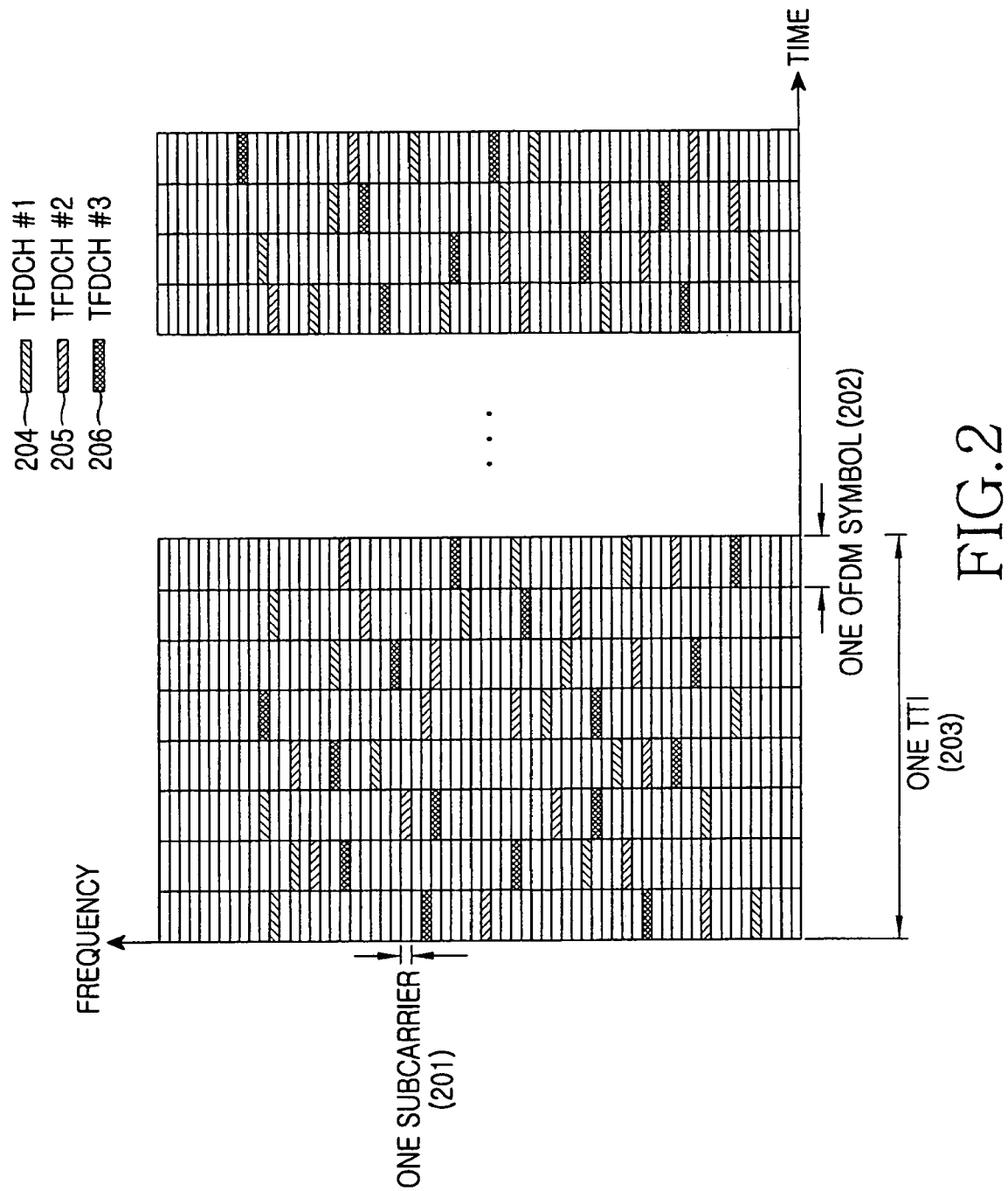
FIG. 2 illustrates an example of indexing of a plurality of physical channels in the conventional OFDM wireless communication system.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention is intended to provide a TFDCH indexing method in which each TFDCH corresponding to a physical channel is defined by "a $k^{th}$ of N groups" formed from time-frequency resources (i.e. a plurality of subcarriers) in a TTI and the physical channel is identified by an ordered pair (N, k).

When physical channels of different channel lengths exist during the same TTI, the ordered pairs (N, k) for identifying the physical channels are configured in a tree structure such that the time-frequency resources used can be identified more efficiently.

The denotation of "a $k^{th}$ of N groups" characteristic of the physical channel indexing method according to the exemplary embodiments of the present invention and the indexing of physical channels in a tree structure will be described in detail.

Assuming that one TTI includes 10 OFDM symbols each having 500 subcarriers, for example, then 5,000 time-frequency resources exist during one TTI. Physical channels are indicated by ordered pairs (N, k) in a tree structure as follows.

The sentence "physical channels are indicated in ordered pairs (N, k)" signifies that all of the time-frequency resources are grouped into N groups and a physical channel is a $k^{th}$ of the N groups. This physical channel indexing method is summarized below:

(1) When all of the time-frequency resources are allocated to a single physical channel, the number of available physical channels is '1' and thus the physical channel is defined as TFDCH (1, 0).

(2) When all of the time-frequency resources are allocated to two physical channels, the number of available physical channels is '2' and the two physical channels are defined as TFDCH (2, 0) and TFDCH (2, 1).

(3) When all of the time-frequency resources are allocated to three physical channels, the number of available physical channels is '3' and the three physical channels are defined as TFDCH (3, 0), TFDCH (3, 1) and TFDCH (3, 2).

(4) The above specific examples of physical channel indexing can be algebraically generalized as indexing a physical channel as TFDCH (N, k) through deductive reasoning.

There are a variety of methods of defining N physical channels with time-frequency resources, which are mathematically expressed as $$\text{TFDCH}(N,k) = \text{set of subcarriers with index } n, n\%N = (k+L+B)\%N \quad (1)$$

where % denotes a modulo operation, L denotes an OFDM symbol index in the TTI, B denotes a Base Station (BS) index, N denotes the number of physical channels to be configured, k (=0, ..., N−1) denotes a TFDCH index, and n denotes a subcarrier index within an OFDM symbol. Therefore, TFDCH (N, k) is a set of subcarriers with index n satisfying Eq. (1). For better understanding of Eq. (1), FIG. 3 will be described below.

Figure 3:
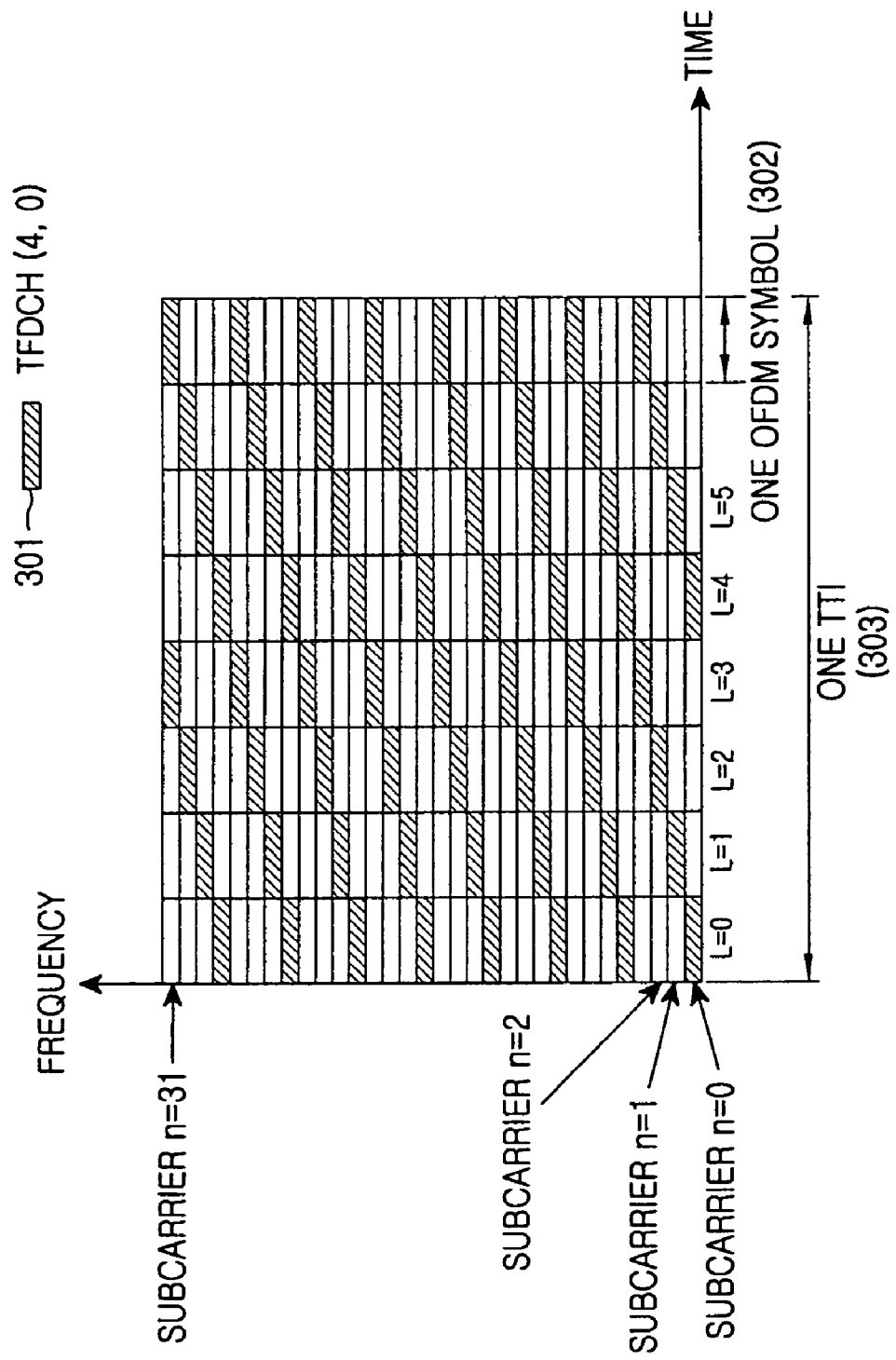
FIG. 3 illustrates indexing of a plurality of physical channels according to a first exemplary embodiment of the present invention.

FIG. 3 illustrates indexing of a plurality of physical channels according to a first exemplary embodiment of the present invention.

Referring to FIG. 3, the horizontal axis represents time and the vertical axis represents frequency. One TTI 303 is comprised of 8 OFDM symbols 302 each having 32 subcarriers. For N=4, B=0, and k=0, reference numeral 301 denotes the subcarriers of TFDCH (4, 0).

The 8 OFDM symbols are indexed from L=0 to L=7 and the 32 subcarriers in each OFDM symbol are indexed from n=0 to n=31. The subcarriers of TFDCH (4, 0) satisfying Eq. (1) are marked with lines slanted from upper right to lower left. Eq. (1) is one of a plurality of mathematical definitions for easily configuring TFDCHs of a predetermined length by a modulo operation. Besides Eq. (1), many other mathematical formulas are available to configuring TFDCHs of different lengths to serve different purposes. A description will now be made of indexing the above different TFDCHs in a tree structure with reference to FIG. 4.

Figure 4:
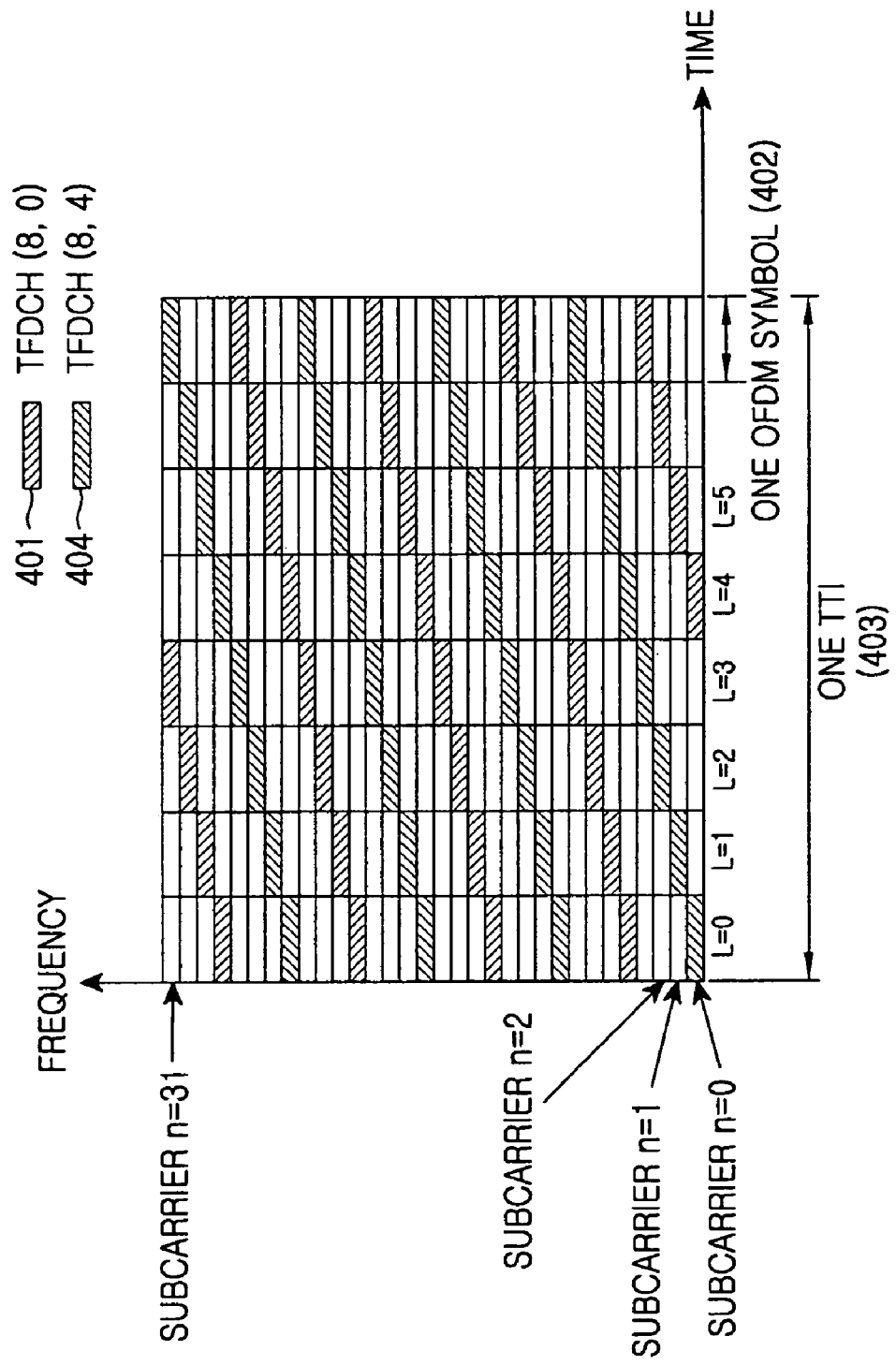
FIG. 4 illustrates indexing of a plurality of physical channels in a tree structure according to the first exemplary embodiment of the present invention.

FIG. 4 illustrates indexing of a plurality of physical channels in a tree structure according to the first exemplary embodiment of the present invention.

Referring to FIG. 4, one TTI 403 includes 8 OFDM symbols each having 32 subcarriers. For N=8, B=0 and k=0 and 4, reference numeral 401 denotes the subcarriers of TFDCH (8, 0) and reference numeral 404 denotes the subcarriers of TFDCH (8, 4). TFDCH (8, 0) is marked with lines slanted from upper left to lower right, and TFDCH (8, 4) is marked with lines slanted from upper right to lower left.

The 8 OFDM symbols are indexed from L=0 to L=7 and the 32 subcarriers in each OFDM symbol are indexed from n=0 to n=31.

A comparison between FIGS. 3 and 4 reveals that a combination of TFDCH (8, 0) and TFDCH (8, 4) is identical to TFDCH (4, 0). In other words, TFDCH (8, 0) and TFDCH (8, 4) are derived from TFDCH (4, 0). This feature is essential to the physical channel indexing method of the exemplary embodiments of the present invention, as shown in a specific manner in FIG. 5.

Figure 5:
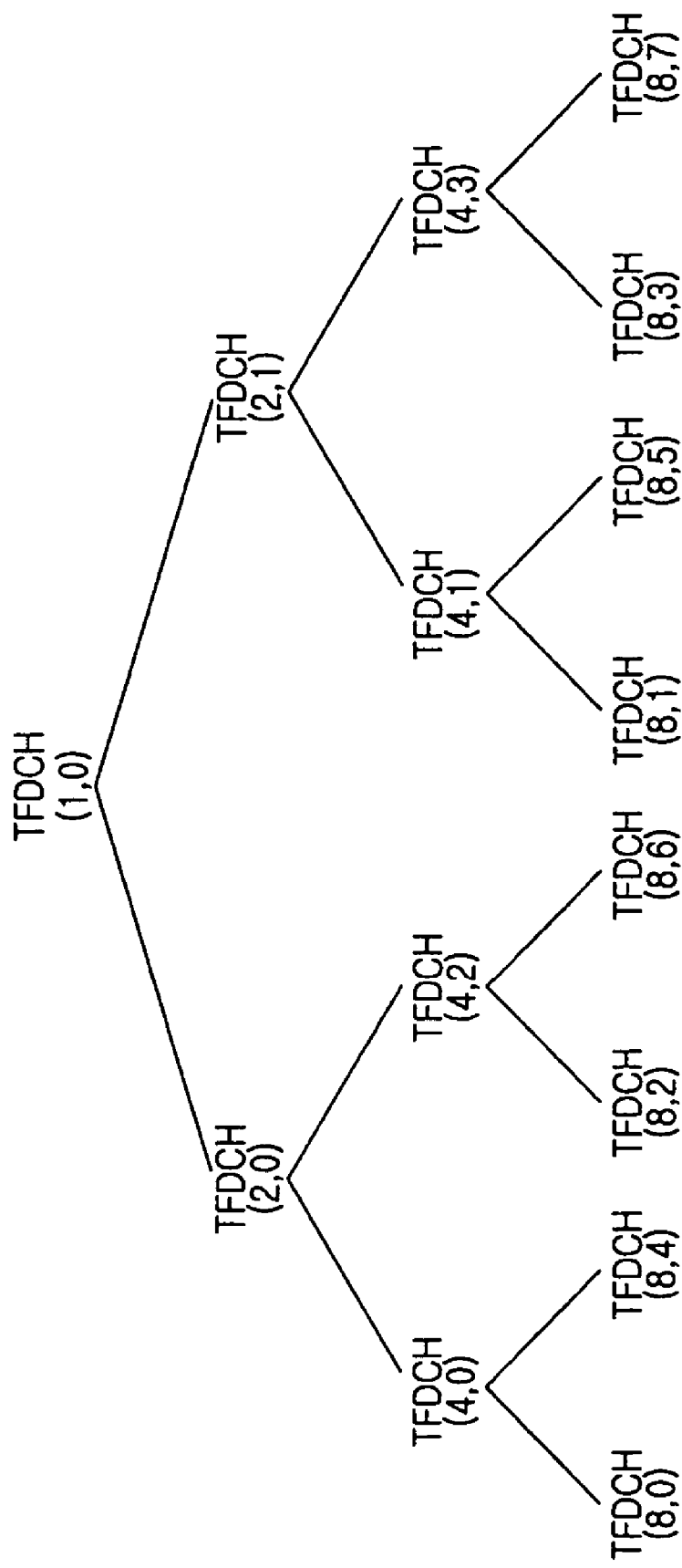
FIG. 5 illustrates a hierarchical representation of the tree structure illustrated in FIG. 4 according to the first exemplary embodiment of the present invention.

FIG. 5 illustrates a hierarchical representation of the tree structure illustrated in FIG. 4 according to the first exemplary embodiment of the present invention.

Referring to FIG. 5, allocation of the total time-frequency resources of one TTI to one physical channel results in one TFDCH, which is TFDCH (1, 0). Allocation of the total time-frequency resources to two physical channels results in two TFDCHs, TFDCH (2, 0) and TFDCH (2, 1) which in combination are identical to TFDCH (1, 0). In the same manner, TFDCH (4, 0) and TFDCH (4, 2) are derived from TFDCH (2, 0), and TFDCH (8, 0) and TFDCH (8, 4) are derived from TFDCH (4, 0). The above reasoning extends to the other TFDCHs depicted in FIG. 5.

As described above, TFDCHs of different lengths can be configured with time-frequency resources in a TTI and indexing the TFDCHs with corresponding node values, i.e. (N, k) facilitates an exchange of information about the resources used for a specific physical channel between a transmitter and a receiver. An example will be described while referring to FIG. 6.

Figure 6:
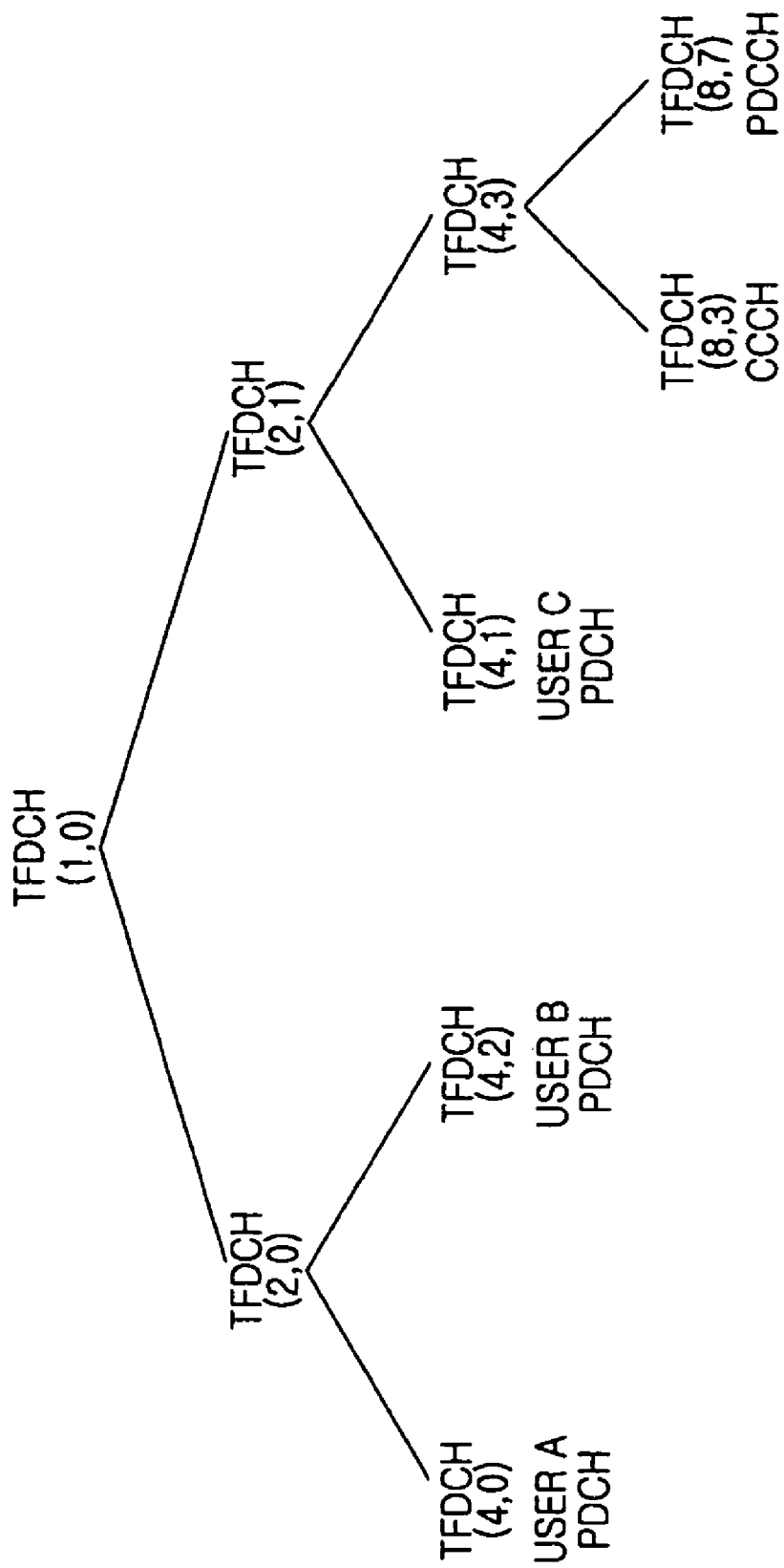
FIG. 6 illustrates TFDCHs corresponding to a plurality of physical channels of different lengths multiplexed in one TTI according to the first exemplary embodiment of the present invention.

FIG. 6 illustrates TFDCHs corresponding to a plurality of physical channels of different lengths multiplexed in one TTI according to the first exemplary embodiment of the present invention.

Referring to FIG. 6, TFDCH (4, 0), TFDCH (4, 2) and TFDCH (4, 1) are respectively used as PDCHs for users A, B and C. TFDCH (8, 3) and TFDCH (8, 7) each being of length 8 derived from TFDCH (4, 3) are allocated as a CCCH and a PDCCH, respectively.

The following description is made of how a resource allocation unit is defined, indicated, and allocated according to further exemplary embodiments of the present invention.

In the exemplary embodiments of the present invention, there are two ways to define and indicate a resource allocation unit regarding two-dimensional resources, i.e. a plurality of time-frequency bins in a TTI. One of them is a Distributed Resources Channel (DRCH) method in which a channel is configured with resources that are regularly scattered and indicated. The other is a Localized Resources CHannel (LRCH) method in which a channel is configured with adjacent resources and indicated. Resource allocation units defined by the DRCH and LRCH methods are indicated as DRCH (N, k) and LRCH (N, k), respectively, and resources are allocated to each physical channel by setting N and k in DRCH (N, k) and LRCH (N, k). DRCH (N, k) will first be described with reference to FIGS. 7 and 8.

Figure 7:
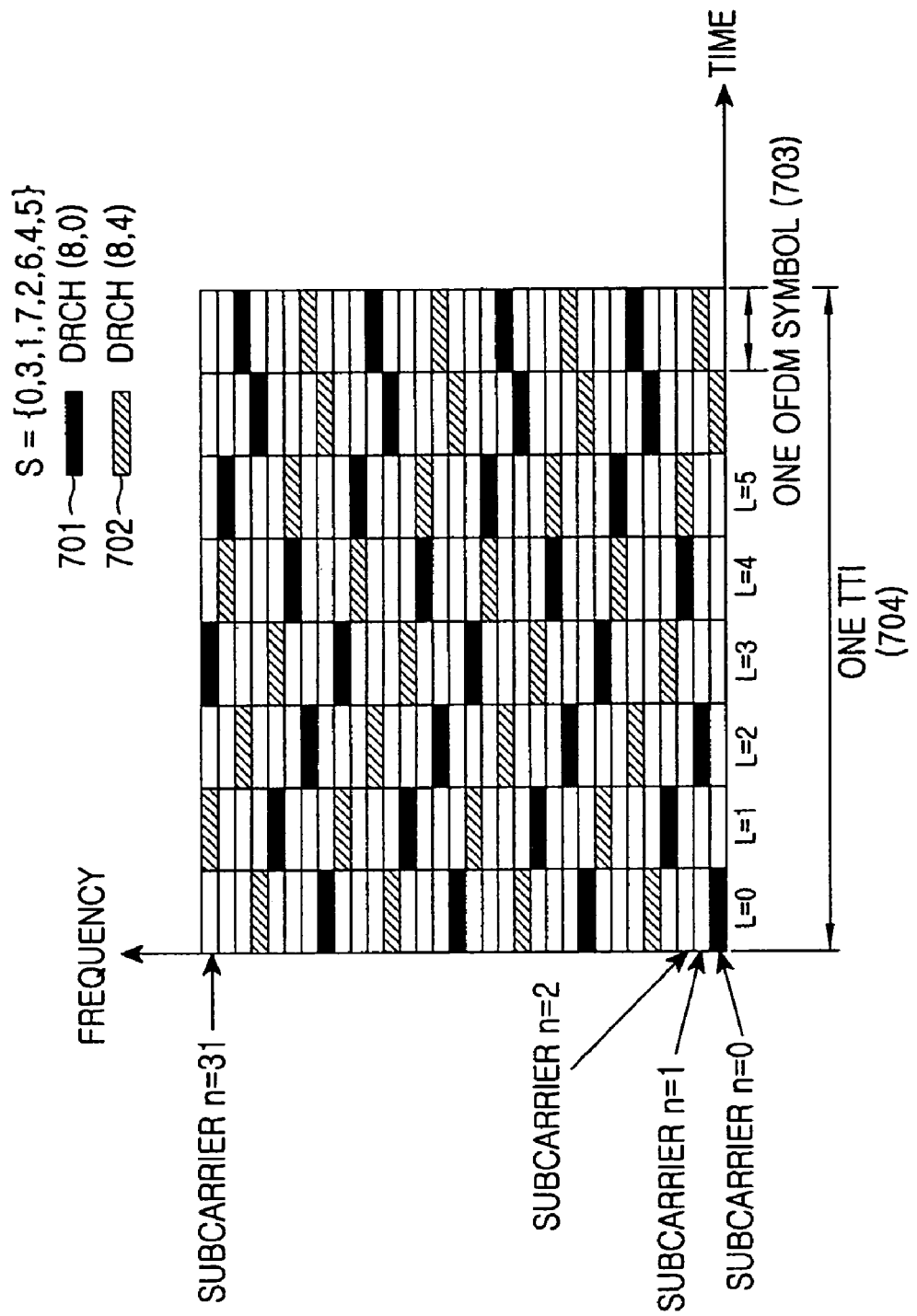
FIG. 7 illustrates indexing of physical channels as DRCH (N, k) according to a second exemplary embodiment of the present invention.

FIG. 7 illustrates the indexing of physical channels as DRCH (N, k) according to a second exemplary embodiment of the present invention. DRCH (N, k) corresponds to a kth of N groups each having distributed or scattered time-frequency resources in a TTI.

Referring to FIG. 7, 8 OFDM symbols 703 exist in one TTI 704. The OFDM symbols are indexed from L=0 to L=7. Each OFDM symbol 703 has 32 subcarriers indexed from n=0 to n=31. For N=8, reference numerals 701 and 702 denote resources corresponding to DRCH (8, 0) and resources corresponding to DRCH (8, 4), respectively. Resources are allocated to DRCH (8, 0) in the following manner.

In each OFDM symbol, 32 subcarriers are grouped into N groups (i.e. 8 groups in FIG. 7), each having equidistant subcarriers. Specifically, for group #0, the indexes of subcarriers, n={0, 8, 16, 24}. For group #1, n={1, 9, 17, 25}. n={2, 10, 18, 26} for group #2, n={3, 11, 19, 27} for group #3, n={4, 12, 20, 28} for group #4, n={5, 13, 21, 29} for group #5, n={6, 14, 22, 30} for group #6, and n={7, 15, 23, 31} for group #7. In this example with N=8, the subcarriers of each group in each OFDM symbol are characteristically spaced from one another by the same distance in the frequency domain. The time-frequency resources of DRCH (8, 0) are determined according to a BS-specific sequence S. The sequence S has as many elements as the number of OFDM symbols per TTI.

In the illustrated case of FIG. 7, the sequence S={0, 3, 1, 7, 2, 6, 4, 5}. This sequence indicates group indexes for used in the respective OFDM symbols. For a BS having S={0, 3, 1, 7, 2, 6, 4, 5}, the time-frequency resources of DRCH (8, 0) in a TTI are group #0 in OFDM symbol #0, group #3 in OFDM symbol #1, group #1 in OFDM symbol #2, group #7 in OFDM symbol #3, group #2 in OFDM symbol #4, group #6 in OFDM symbol #5, group #4 in OFDM symbol #6, and group #5 in OFDM symbol #7.

When expressed in a generalized form, when the BS uses the sequence S={0, 3, 1, 7, 2, 6, 4, 5}, groups represented by {(0+k) % N, (3+k) % N, (1+k), (7+k) % N, (2+k) % N, (6+k) % N, (4+k) % N, (5+k) % N} are allocated to DRCH (8, k) in the sequential OFDM symbols of a TTI.

Therefore, groups corresponding to {4%8, 7%8, 5%8, 11%8, 6%8, 10%8, 8%8, 9%8}, i.e. {4, 7, 5, 3, 6, 2, 0, 1} are allocated to DRCH (8, 4) in the sequential OFDM symbols of the TTI in FIG. 7.

Figure 8:
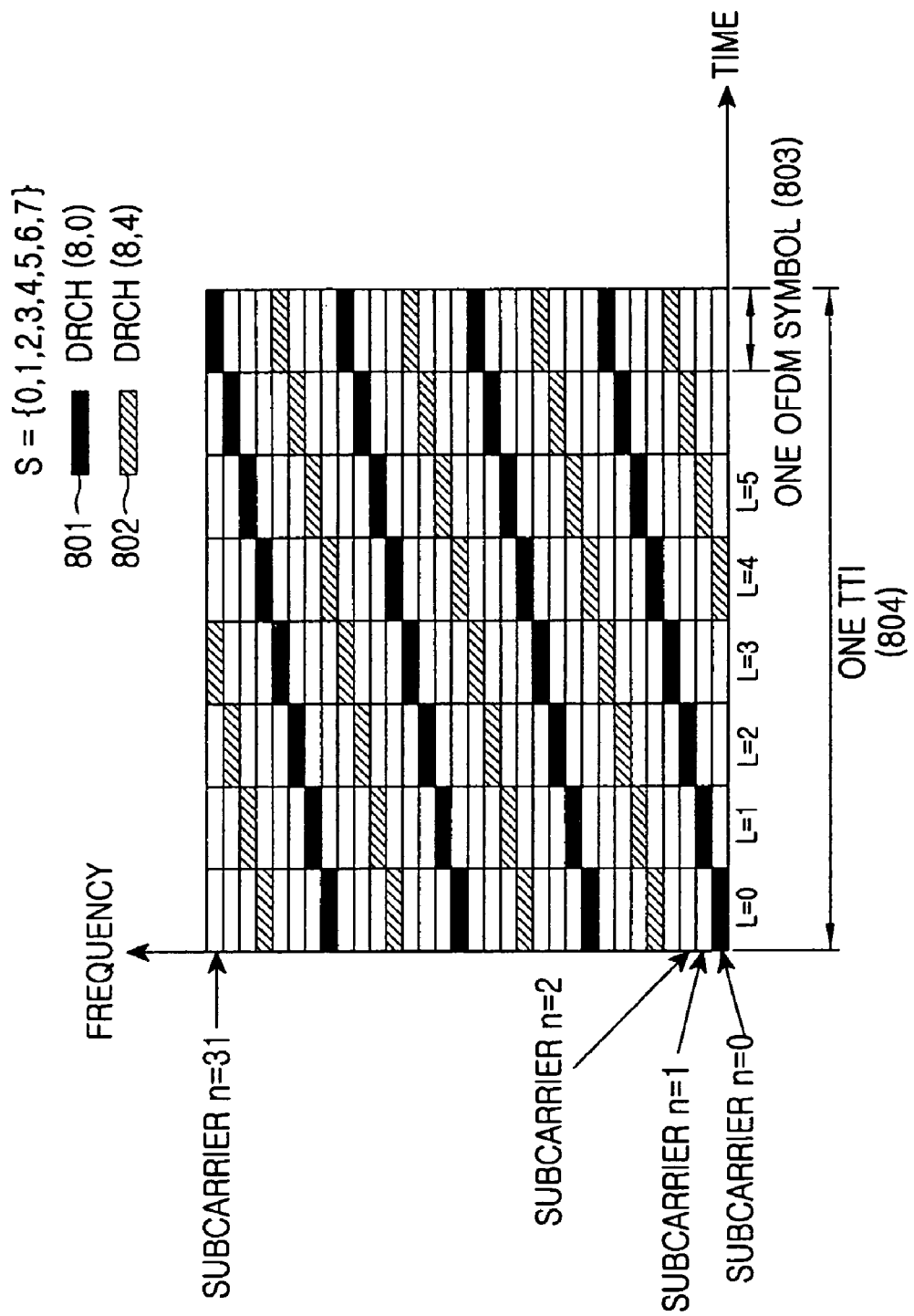
FIG. 8 illustrates resource allocation to DRCH (8, 0) and DRCH (8, 4) when S={0, 1 2, 3, 4, 5, 6, 7} according to the second exemplary embodiment of the present invention.

FIG. 8 illustrates resource allocation to DRCH (8, 0) and DRCH (8, 4) when S={0, 1 2, 3, 4, 5, 6, 7} according to the second exemplary embodiment of the present invention.

Referring to FIG. 8, the above resource allocation method involves determining the allocation of resources using the DRCH method and the allocation of ordered pairs (N, k). These ordered pairs (N, k) are formed in a tree structure so that time-frequency resources used for physical channels of different channel lengths in a TTI can be more efficiently identified.

How DRCHs can be indexed in the tree structure will now be described with reference to FIGS. 4 and 7. Referring to FIG. 7, 8 OFDM symbols 703 indexed from L=0 to L=7 exist in one TTI 704. Also referring to FIG. 4, each OFDM symbol includes 32 subcarriers indexed from n=0 to n=31. As described above in relation to FIG. 4, DRCH (8, 0) 701 and DRCH (8, 4) 702 in combination are identical to DRCH (4, 0). In the same manner, for S={0, 3, 1, 7, 2, 6, 4, 5}, DRCH (4, 0) is configured as follows.

Since N=4, the subcarriers of each OFDM symbol are divided into 4 groups indexed from 0 to 3, each having equidistant subcarriers. Modulo-N (N=4) operation of the elements of S results in {3, 1, 3, 2, 2, 0, 1} and groups corresponding to the resulting sequence are allocated to DRCH (4, 0). The subcarriers of DRCH (4, 0) are identical to those of DRCH (8, 0) 701 and DRCH (8, 4) 702 in combination, as illustrated in FIG. 7. In other words, DRCH (8, 0) and DRCH (8, 4) are derived from DRCH (4, 0). This tree structure is shown in FIG. 9.

Figure 9:
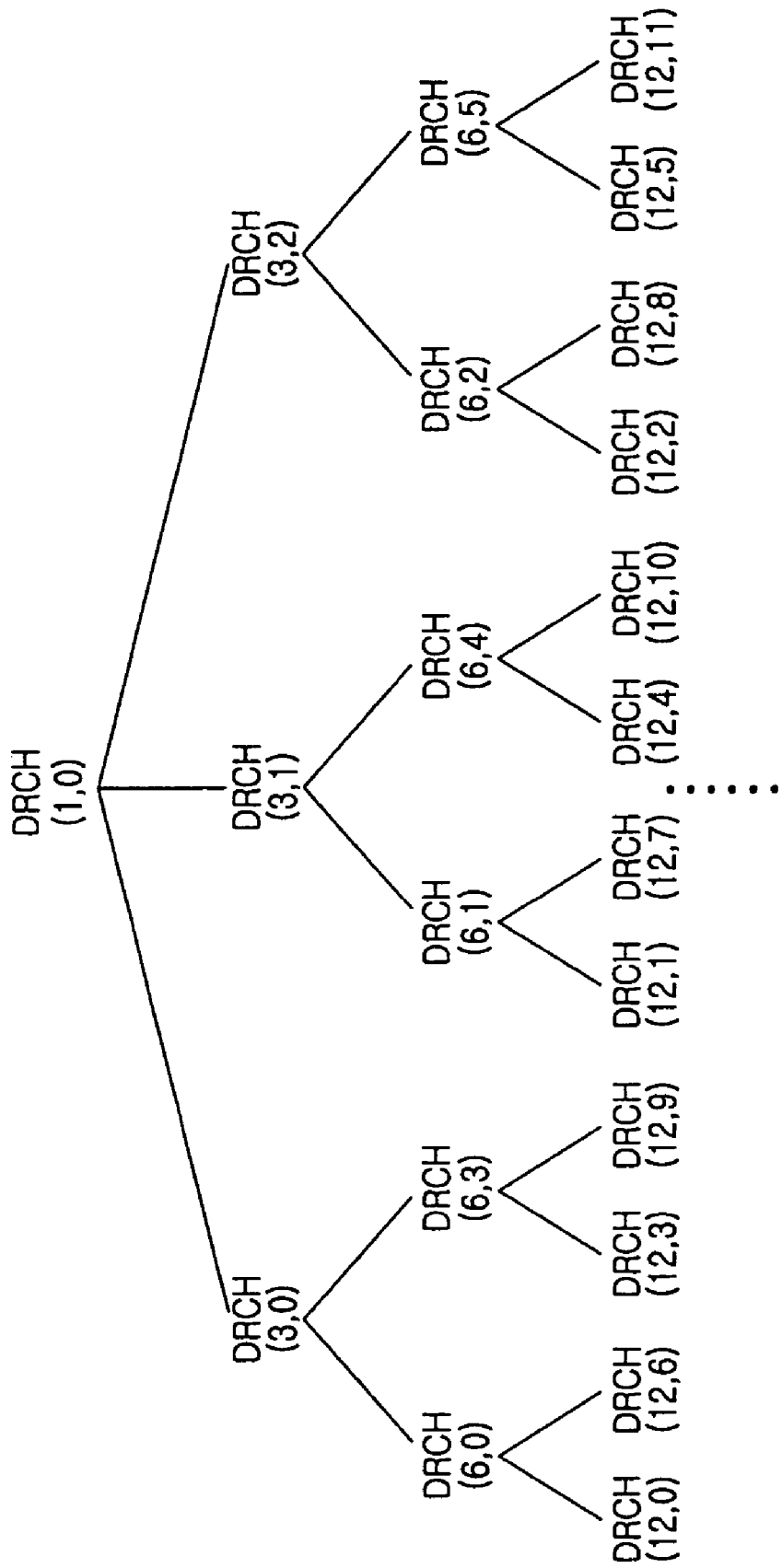
FIG. 9 illustrates a hierarchical representation of the tree structure illustrated in FIG. 8 according to the second exemplary embodiment of the present invention.

FIG. 9 illustrates a hierarchical representation of the tree structure illustrated in FIG. 8 according to the second exemplary embodiment of the present invention.

Referring to FIG. 9, the allocation of all of the time-frequency resources of one TTI to one physical channel results in one DRCH, DRCH (1, 0). Allocation of the total time-frequency resources to three physical channels results in three DRCHs, DRCH (3, 0), DRCH (3, 1), and DRCH (3, 2), which in combination are identical to DRCH (1, 0). In the same manner, DRCH (6, 0) and DRCH (6, 3) are derived from DRCH (3, 0). The above reasoning extends to the other DRCH s depicted in FIG. 9.

As described above, DRCHs of different lengths can be configured with time-frequency resources in a TTI and the DRCHs can be indexed with corresponding node values, i.e. (N, k) facilitates the exchange of information about resources used for a specific physical channel between a transmitter and a receiver. An example will be described referring to FIG. 10.

Figure 10:
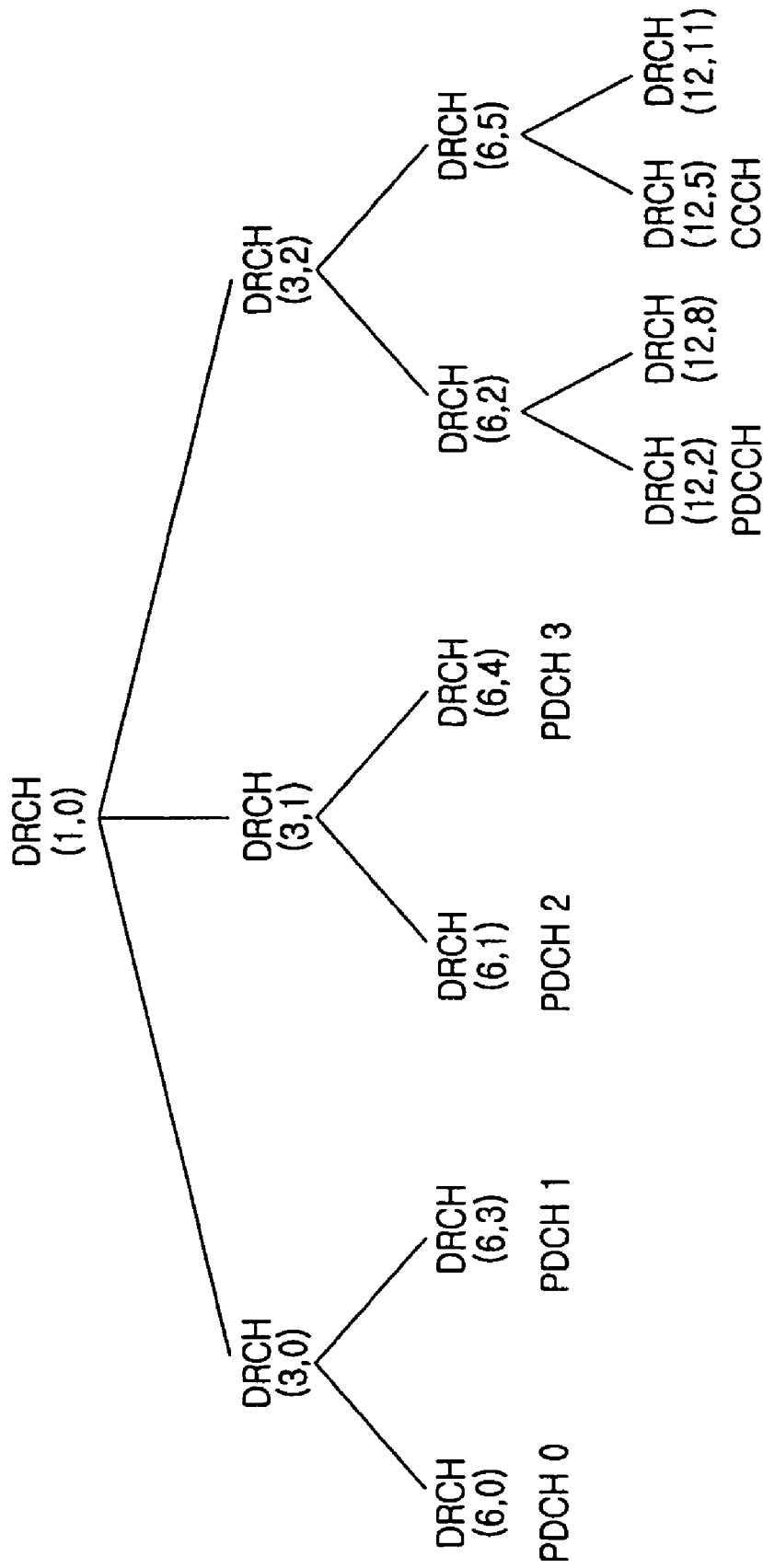
FIG. 10 illustrates DRCHs corresponding to a plurality of physical channels of different lengths multiplexed in one TTI according to the second exemplary embodiment of the present invention.

FIG. 10 illustrates DRCHs corresponding to a plurality of physical channels of different lengths multiplexed in one TTI according to the second exemplary embodiment of the present invention.

Referring to FIG. 10, DRCH (6, 0), DRCH (6, 3), DRCH (6, 1) and DRCH (6, 4) are respectively used as PDCH 0 to PDCH 4. DRCH (12, 2) is allocated as a PDCCH and DRCH (12, 5) is allocated as a CCCH. By allocating N and k in DRCH (n, k), resources are allocated to each physical channel in the above resource allocation unit defining and indicating method. Now a description will be made of LRCH (N, k) with reference to FIG. 11.

Figure 11:
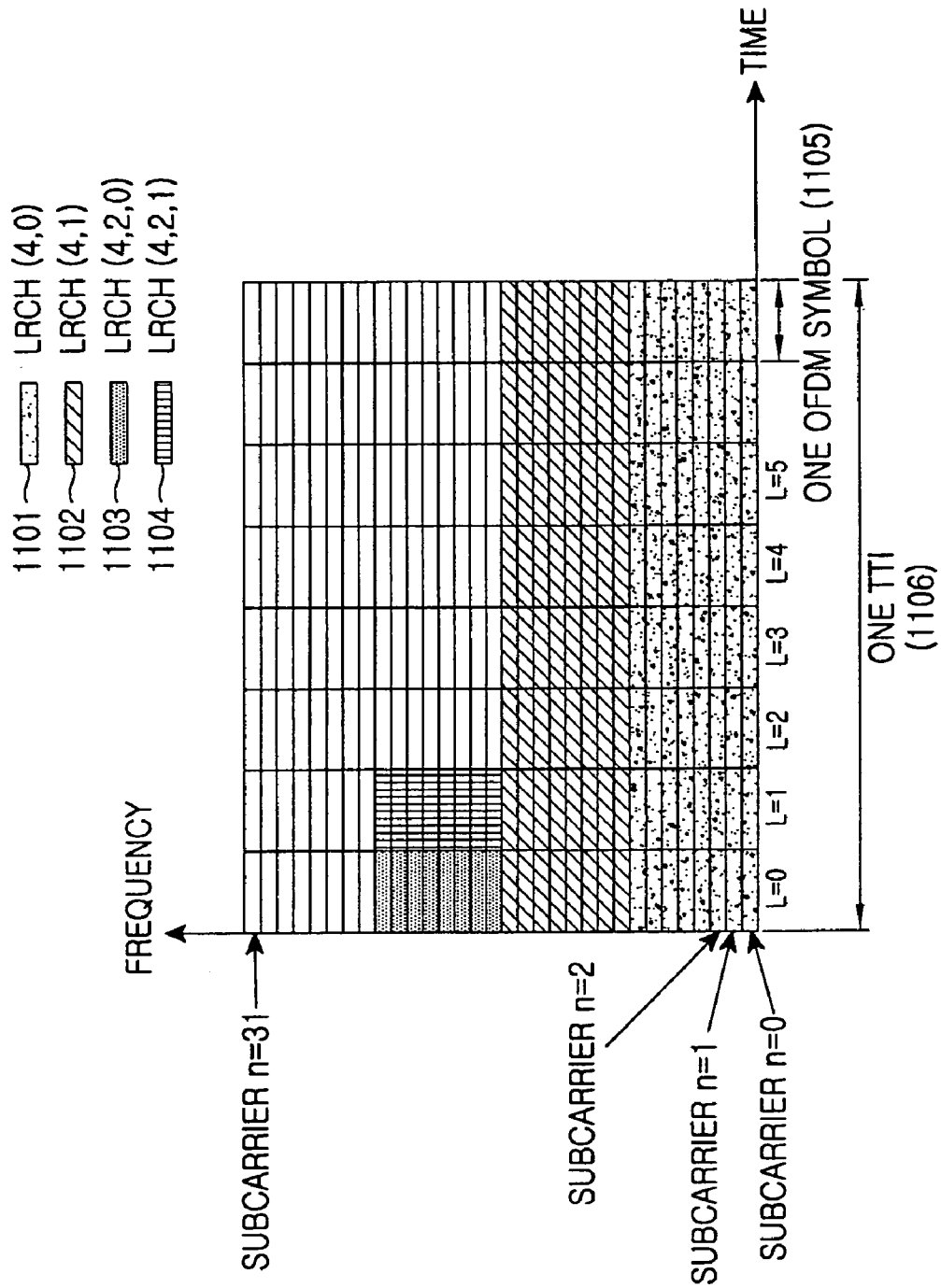
FIG. 11 illustrates indexing of physical channels as LRCH (N, k) according to a third exemplary embodiment of the present invention.

FIG. 11 illustrates indexing of physical channels as LRCH (N, k) according to a third exemplary embodiment of the present invention. LRCH (N, k) corresponds to a kth of N groups each being localized time-frequency resources in a TTI.

Referring to FIG. 11, 8 OFDM symbols 1105 exist in one TTI 1106. The OFDM symbols are indexed from L=0 to L=7. Each OFDM symbol 1105 has 32 subcarriers indexed from n=0 to n=31. For N=4 and k=0, reference numeral 1101 denotes resources corresponding to LRCH (4, 0). The resources are 64 subcarriers with index n=0 to 7 in the 8 OFDM symbols of the TTI. Over the 8 OFDM symbols of the TTI, 64 subcarriers with index n=8 to 15 are allocated to LRCH (4, 1) as indicated by reference numeral 1102, 64 subcarriers with index n=16 to 23 to LRCH (4, 2), and 64 subcarriers with index n=24 to 31 to LRCH (4, 3). When LRCH (2, 0) is configured in the same manner, the resources of LRCH (2, 0) are identical to those of LRCH (4, 0) and LRCH (4, 1) in combination.

The above LRCH tree structure illustrated in FIG. 11 is similar to the DRCH tree structure illustrated in FIG. 10 in terms of properties. LRCH (N, k) can be divided into a plurality of groups in time, such as LRCH (N, k, m) where m is a time index, i.e. an OFDM symbol index in a TTI. Reference numeral 1103 denotes resources corresponding to LRCH (4, 2, 0) within the first OFDM symbol. Similarly, LRCH (4, 2, 1) occupies resources 1104 in the second OFDM symbol. Therefore, a combination of LRCH (4, 2, 0) and LRCH (4, 2, 1) is included in LRCH (4, 2). LRCH (N, k, m) is available when data for a plurality of users are multiplexed in LRCH (N, k).

Figure 12:
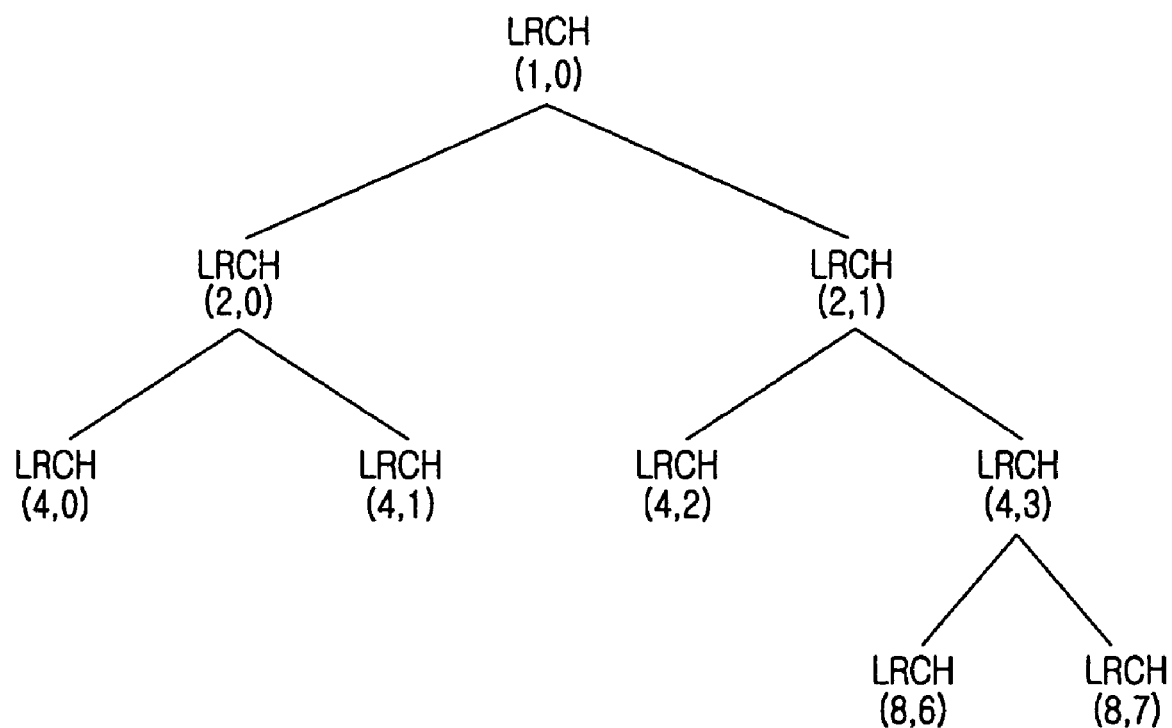
FIG. 12 illustrates a hierarchical representation of the tree structure illustrated in FIG. 11 according to the third exemplary embodiment of the present invention.

FIG. 12 illustrates a hierarchical representation of the tree structure illustrated in FIG. 11 according to the third exemplary embodiment of the present invention.

Referring to FIG. 12, allocation of the total time-frequency resources of one TTI to one physical channel results in one LRCH, which is LRCH (1, 0). Allocation of all of the time-frequency resources to two physical channels results in two LRCHs, LRCH (2, 0) and LRCH (2, 1), which in combination are identical to LRCH (1, 0). In the same manner, LRCH (4, 2) and LRCH (4, 3) are derived from LRCH (2, 1). The above reasoning extends to the other LRCH s depicted in FIG. 9

Figure 13:
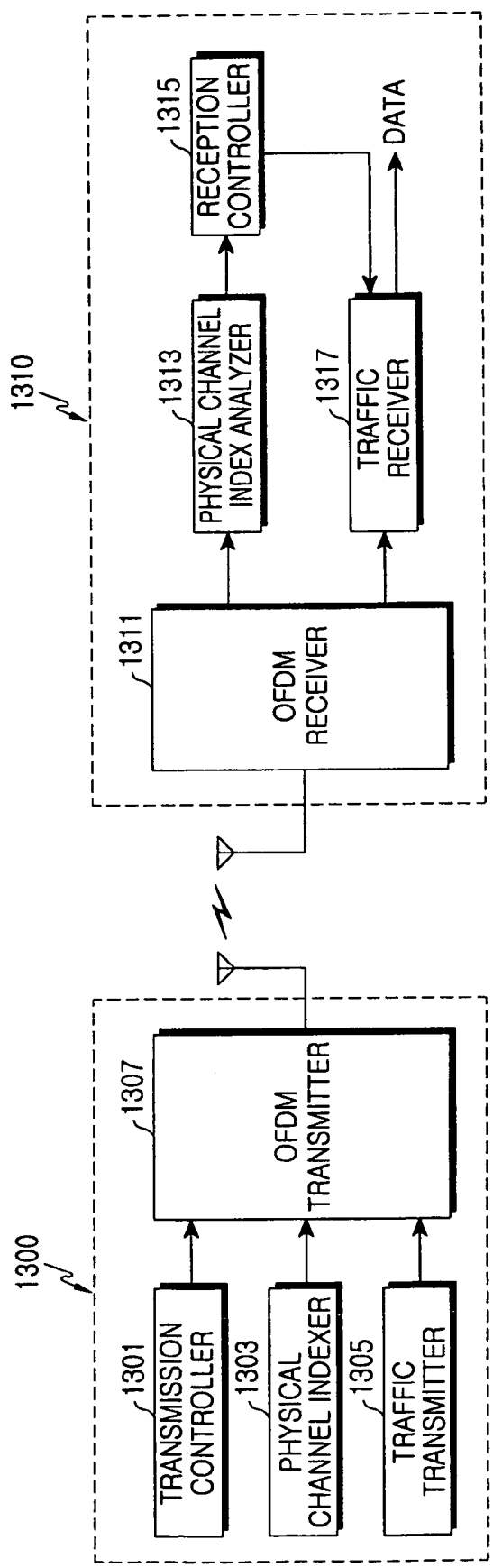
FIG. 13 is a block diagram of a transmitter and a receiver in an OFDM system for indexing physical channels according to an exemplary embodiment of the present invention.

FIG. 13 is a block diagram of a transmitter and a receiver in an OFDM system for indexing physical channels according to an exemplary embodiment of the present invention.

Referring to FIG. 13, a transmitter 1300 includes a transmission controller 1301, a physical channel indexer 1303, a traffic transmitter 1305, and an OFDM transmitter 1307.

The transmission controller 1301 controls the multiplexing of a plurality of physical channels having different lengths in one TTI according to the physical channel indexing method of the exemplary embodiments of the present invention. The physical channel indexer 1303 constructs index information for the physical channels under the control of the transmission controller 1301. The traffic transmitter 1305 stores traffic received from another block or a higher-layer node in its internal buffer. The OFDM transmitter 1307 constructs a frame by multiplexing the index information and a traffic channel under the control of the transmission controller 1301. Functional elements of the transmitter 1300 beyond the scope of the exemplary embodiments of the present invention, for example, Inverse Fast Fourier Transform (FFT) are not shown in FIG. 13.

A receiver 1310 includes an OFDM receiver 1311, a physical channel index analyzer 1313, a reception controller 1315, and a traffic receiver 1317.

The OFDM receiver 1311 receives a frame from the transmitter 1300 and demultiplexes the frame under the control of the reception controller 1315. The physical channel index analyzer 1313 analyzes index information about the received physical channels under the control of the reception controller 1315. The reception controller 1315 controls the demultiplexing of a TTI into physical channels having different lengths according to the physical channel indexing method of the exemplary embodiments of the present invention. The traffic receiver 1317 stores traffic data received from the OFDM receiver 1315 in its internal buffer. Like the transmitter 1300, functional elements of the receiver 1310 beyond the scope of the exemplary embodiments of the present invention are not shown.

In accordance with the exemplary embodiments of the present invention as described above, since physical channels with different lengths are configured and indexed in a tree structure in an OFDM wireless communication system, two-dimensional resources allocated to each physical channel can be easily communicated between a transmitter and a receiver.

Also, the exemplary embodiments of the present invention provide easy indication of subcarriers allocated to each physical channel, thereby enabling efficient scheduling and resource utilization.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of indexing physical channels for communication between a transmitter and a receiver in an Orthogonal Frequency Division Multiple Access (OFDMA) system where one Orthogonal Frequency Division Multiplexing (OFDM) symbol includes a plurality of subcarriers and one Transmission Time Interval (TTI) includes a plurality of OFDM symbols, the method comprising the steps of:

dividing a total number of subcarriers per OFDM symbol into N groups;

selecting a $k^{th}$ group from the N groups in each OFDM symbol of a TTI; and indexing a physical channel corresponding to a set of subcarriers included in the $k^{th}$ group with an ordered pair (N, k);

constructing index information for a plurality of physical channels each of which has been indexed using the indexing operation;

constructing a frame for transmission by multiplexing the index information for the plurality of physical channels and a traffic channel.

2. The method of claim 1, wherein the step of selecting is determined by a offset of each OFDM symbol indicated by a base station-specific sequence S having L elements, wherein L is the number of OFDM symbols included in the TTI and S={S1, ..., SL}.

3. The method of claim 2, wherein the sequence S={S1, ..., SL} is computed by {(S1+k) % N, ..., (SL+k) % N} where % denotes a modulo operation.

4. The method of claim 1, wherein when subcarrier sets corresponding to indexed physical channels are ordered in a tree structure according to the relationship between ordered pairs (N, k), the union of subcarrier sets indexed with neighbor child ordered pairs is identical to a subcarrier set indexed with a mother ordered pair.

5. A transmitter for indexing physical channels and transmitting the indexed physical channels in an Orthogonal Frequency Division Multiple Access (OFDMA) system where one Orthogonal Frequency Division Multiplexing (OFDM) symbol includes a plurality of subcarriers and one Transmission Time Interval (TTI) includes a plurality of OFDM symbols, the transmitter comprising:
- a transmission controller for dividing a total number of subcarriers per OFDM symbol into N groups, selecting a $k^{th}$ group from the N groups in each OFDM symbol of a TTI, indexing a physical channel corresponding to a set of subcarriers included in the $k^{th}$ group with an ordered pair (N, k), and controlling multiplexing of a plurality of physical channels each of which has been indexed using the indexing operation;
- a physical channel indexer for constructing index information of the plurality of physical channels, under the control of the transmission controller; and
- an OFDM transmitter for constructing a frame to be transmitted to a receiver by multiplexing the index information for the plurality of physical channels and a traffic channel, under the control of the transmission controller.

6. The transmitter of claim 5, the step of selecting is determined by a offset of each OFDM symbol indicated by a base station-specific sequence S having L elements, wherein L is the number of OFDM symbols included in the TTI and S={S1, ..., SL}.

7. The transmitter of claim 6, wherein the sequence S={S1, ..., SL} is computed by {(S1+k) % N, ..., (SL+k) % N} where % denotes a modulo operation.

8. The transmitter of claim 5, wherein when subcarrier sets corresponding to the indexed physical channels are ordered in a tree structure according to the relation between ordered pairs (N, k), the union of subcarrier sets corresponding to neighbor child ordered pairs is identical to a subcarrier set corresponding to a mother ordered pair.

9. A receiver for receiving indexed physical channels and information about the indexes of the physical channels in an Orthogonal Frequency Division Multiple Access (OFDMA) system where one Orthogonal Frequency Division Multiplexing (OFDM) symbol includes a plurality of subcarriers and one Transmission Time Interval (TTI) includes a plurality of OFDM symbols, the receiver comprising:
- an OFDM receiver for receiving a frame from a transmitter and demultiplexing the received frame into the index information of physical channels and a traffic channel, under the control of a reception controller;
- a physical channel index analyzer for analyzing the index information of the received physical channels, under the control of the reception controller; and
- the reception controller for controlling the demultiplexing of the physical channels from a TTI, each of the physical channels being indexed by dividing a total number of subcarriers per OFDM symbol into N groups, selecting a kth group from the N groups in each OFDM symbol of the TTI, and indexing a physical channel corresponding to a set of subcarriers included in the $k^{th}$ group with an ordered pair (N, k).

10. The receiver of claim 9, the step of selecting is determined by a offset of each OFDM symbol indicated by a base station-specific sequence S having L elements, wherein L is the number of OFDM symbols included in the TTI and S={S1, ..., SL}.

11. The receiver of claim 10, wherein the sequence S={S1, ..., SL} is computed by {(S1+k) % N, (SL+k) % N} where % denotes a modulo operation.

12. The receiver of claim 9, wherein when subcarrier sets corresponding to the indexed physical channels are ordered in a tree structure according to the relation between ordered pairs (N, k), the union of subcarrier sets corresponding to neighbor child ordered pairs is identical to a subcarrier set corresponding to a mother ordered pair.

13. A system for transmitting and receiving indexed physical channels in an Orthogonal Frequency Division Multiple Access (OFDMA) system where one Orthogonal Frequency Division Multiplexing (OFDM) symbol includes a plurality of subcarriers and one Transmission Time Interval (TTI) includes a plurality of OFDM symbols, the system comprising:
- a base station comprising a transmitter for dividing a total number of subcarriers per OFDM symbol into N groups, selecting a $k^{th}$ group from the N groups in each OFDM symbol of a TTI, indexing a physical channel corresponding to a set of subcarriers included in the $k^{th}$ group with an ordered pair (N, k), and transmitting the indexed physical channel; and
- a terminal comprising a receiver for receiving the physical channel indexed with (N, k) from the transmitter of the base station.

14. The system of claim 13, the step of selecting is determined by a offset of each OFDM symbol indicated by a base station-specific sequence S having L elements, wherein L is the number of OFDM symbols included in the TTI and S={S1, ..., SL}.

15. The system of claim 14, wherein the sequence S={S1, ..., SL} is computed by {(S1+k) % N, ..., (SL+k) % N} where % denotes a modulo operation.

16. The system of claim 13, wherein when subcarrier sets corresponding to indexed physical channels are ordered in a tree structure according to the relationship between ordered pairs (N, k), the union of subcarrier sets indexed with neighbor child ordered pairs is identical to a subcarrier set indexed with a mother ordered pair.

17. A method of indexing physical channels in an Orthogonal Frequency Division Multiple Access (OFDMA) system for communication between a transmitter and a receiver where one Orthogonal Frequency Division Multiplexing (OFDM) symbol includes a plurality of subcarriers and one Transmission Time Interval (TTI) includes a plurality of OFDM symbols, the method comprising the step of:
- dividing time-frequency resources of a TTI into N equidistant and localized groups and performing a first indexing operation by indexing a physical channel corresponding to a $k^{th}$ group among the divided N groups with an ordered pair (N, k);
- dividing resources corresponding to the $k^{th}$ group in time into m equidistant groups and performing a second indexing operation by indexing a physical channel corresponding to the divided m groups with ordered triples (N, k, m);
- constructing index information for a plurality of physical channels each of which has been indexed using at least one of the first and second indexing operations; and
- constructing a frame for transmission by multiplexing the index information for the plurality of physical channels and a traffic channel.

18. The method of claim 17, wherein when the resources corresponding to the indexed physical channels are ordered in a tree structure according to the relationship between ordered pairs (N, k), the union of resources indexed with neighbor child ordered pairs is identical to a resource indexed with a mother ordered pair.

19. A transmitter for indexing physical channels and transmitting the indexed physical channels in an Orthogonal Frequency Division Multiple Access (OFDMA) system where one Orthogonal Frequency Division Multiplexing (OFDM) symbol includes a plurality of subcarriers and one Transmission Time Interval (TTI) includes a plurality of OFDM symbols, the transmitter comprising:

a transmission controller for dividing time-frequency resources of the TTI into N equidistant and localized groups, performing a first indexing operation by indexing a resource corresponding to a $k^{th}$ group among the divided N groups with an ordered pair (N, k), dividing resources corresponding to the $k^{th}$ group in time into m equidistant groups, performing a second indexing operation by indexing a physical channel corresponding to the divided m groups with ordered triples (N, k, m), and controlling multiplexing of a plurality of physical channels each of which has been indexed using at least one of the first and second indexing operations;

a physical channel indexer for constructing index information of the physical channels under the control of the transmission controller; and an OFDM transmitter for constructing a frame to be transmitted to a receiver by multiplexing the index information for the plurality of physical channels and a traffic channel under the control of the transmission controller.

20. The transmitter of claim 19, wherein when the resources corresponding to the indexed physical channels are ordered in a tree structure according to the relation between ordered pairs (N, k), the union of resources corresponding to neighbor child ordered pairs is identical to a resource corresponding to a mother ordered pair.

21. A receiver for receiving indexed physical channels and information about the indexes of the physical channels in an Orthogonal Frequency Division Multiple Access (OFDMA) system where one Orthogonal Frequency Division Multiplexing (OFDM) symbol includes a plurality of subcarriers and one Transmission Time Interval (TTI) includes a plurality of OFDM symbols, the receiver comprising:

an OFDM receiver for receiving a frame from a transmitter and demultiplexing the received frame into the index information of physical channels and a traffic channel, under the control of a reception controller;

a physical channel index analyzer for analyzing the index information of the received physical channels, under the control of the reception controller; and the reception controller for controlling the demultiplexing of the physical channels from a TTI, each of the physical channels being indexed by dividing time-frequency resources of the TTI into N equidistant and localized groups, indexing a resource corresponding to a $k^{th}$ group among the divided N groups with an ordered pair (N, k), dividing the resource corresponding to the $k^{th}$ group in time into m equidistant groups, and indexing physical channels corresponding to the divided groups with ordered triples (N, k, m).

22. The receiver of claim 21, wherein when the resources corresponding to the indexed physical channels are ordered in a tree structure according to the relation between ordered pairs (N, k), the union of resources corresponding to neighbor child ordered pairs is identical to a resource corresponding to a mother ordered pair.

23. A system for transmitting and receiving indexed physical channels in an Orthogonal Frequency Division Multiple Access (OFDMA) system where one Orthogonal Frequency Division Multiplexing (OFDM) symbol includes a plurality of subcarriers and one Transmission Time Interval (TTI) includes a plurality of OFDM symbols, the system comprising:

a base station comprising a transmitter for dividing time-frequency resources of the TTI into N equidistant and localized groups, indexing a resource corresponding to a $k^{th}$ group among the divided N groups with an ordered pair (N, k), dividing the resource corresponding to the $k^{th}$ group in time into m equidistant groups, indexing physical channels corresponding to the divided groups with ordered triples (N, k, m), and transmitting the indexed physical channels; and a terminal comprising a receiver for receiving the physical channel indexed with (N, k) from the transmitter of the base station.

24. The system of claim 23, wherein when resources corresponding to the indexed physical channels are ordered in a tree structure according to the relation between ordered pairs (N, k), the union of resources corresponding to neighbor child ordered pairs is identical to a resource corresponding to a mother ordered pair.

* * * * *